United States Patent [19]

Ookawa et al.

[11] Patent Number: 4,691,251
[45] Date of Patent: Sep. 1, 1987

[54] MAGNETIC RECORDING AND REPRODUCING APPARATUS IN WHICH RECORDING IS RESTARTED RESPONSIVE TO RECORDED CUE SIGNALS

[75] Inventors: Katsuhiro Ookawa; Toshifumi Fujii; Yoshihiro Nishida, all of Nagaokakyo, Japan

[73] Assignee: Mitsubishi Denki Kabushiki Kaisha, Tokyo, Japan

[21] Appl. No.: 666,421

[22] Filed: Oct. 30, 1984

[30] Foreign Application Priority Data

Nov. 4, 1983 [JP] Japan .................................. 58-207748

[51] Int. Cl.⁴ ........................ G11B 27/32; G11B 27/08; H04N 5/782
[52] U.S. Cl. ................................. 360/14.1; 360/14.2; 360/70; 360/74.4; 360/72.1; 360/72.2
[58] Field of Search ................ 360/14.1, 14.2, 10.3, 360/72.1, 72.2, 74.1, 74.4, 77, 10.2, 70; 358/311

[56] References Cited

U.S. PATENT DOCUMENTS

| 3,663,766 | 5/1972 | Goto .................................. 360/10.1 |
| 3,890,639 | 6/1975 | O'Donnell et al. .................. 360/14.1 |
| 4,297,733 | 10/1981 | Sanderson .......................... 360/77 |
| 4,358,797 | 11/1982 | Nishijima et al. .................. 360/14.2 |
| 4,463,391 | 7/1984 | Takano et al. ..................... 360/74.4 |
| 4,482,926 | 11/1984 | Nishijima et al. .................. 360/14.2 |
| 4,488,185 | 12/1984 | Toba ................................ 360/14.1 |
| 4,520,406 | 5/1985 | Suzuki et al. ..................... 360/14.2 |

FOREIGN PATENT DOCUMENTS

| 18805 | 5/1974 | Japan . |
| 31795 | 8/1984 | Japan . |
| 554625 | 9/1974 | Switzerland . |
| 1443806 | 7/1976 | United Kingdom . |
| 1443105 | 7/1976 | United Kingdom . |

OTHER PUBLICATIONS

Schneidemeister, TEST Videorecorder and translation in English, Das Band-, Kopfservo-und Spurnachfuhrungs-. . . Technische Info. 3-1980.

Primary Examiner—Raymond F. Cardillo
Assistant Examiner—Robert A. Weinhardt
Attorney, Agent, or Firm—Lowe Price Leblanc Becker & Shur

[57] ABSTRACT

A magnetic recording and reproducing apparatus using a pilot signal control system is adapted such that a cue signal (51) is recorded in a cue track (50) provided besides a video signal track (52) when a magnetic tape (7) is temporarily stopped during the recording operation and is moved in the backward direction by a predetermined amount, and when the temporary stop is cancelled and the magnetic tape is moved in the forward direction, the cue signal (51) is reproduced and the recording operation is restarted responsive to the reproduced cue signal. Preferably, after cancellation of the temporary stop until restart of the recording operation, control is made such that coincidence of the frequency and phase of the reproduced pilot signal and those of a pilot signal to be recorded is established.

10 Claims, 8 Drawing Figures

MAGNETIC RECORDING AND REPRODUCING APPARATUS IN WHICH RECORDING IS RESTARTED RESPONSIVE TO RECORDED CUE SIGNALS

BACKGROUND OF THE INVENTION

1. Field of the Invention

The present invention relates to a magnetic recording and reproducing apparatus and more particularly to a magnetic recording and reproducing apparatus improved such that no disturbance appears in a jointing portion of a picture corresponding to a jointing portion of a picture recording on a magnetic tape at the time of reproduction.

2. Description of the Prior Art

In a conventional home magnetic video reproducing apparatus and a magnetic video recording and reproducing apparatus having a picture recording function, there are generally employed a rotating head system, a helical scanning system and an azimuth system. In the rotating head system, e.g., two video heads are mounted on the circumference of a rotating drum to be separated from each other at an angle of 180°. In the helical scanning system, a magnetic tape is made to travel aslant with respect to the video heads. In the azimuth system, gaps of the two video heads are provided at angles different from each other, so that angles of video signals recorded in the magnetic tape vary with the video heads. These three systems are disclosed in detail in, e.g., U.S. Pat. No. 4,463,390 issued on July 31, 1984 to Yoshio Koga et al. The referenced U.S. patent is incorporated herein by reference thereto.

As a magnetic tape travelling control system in a conventional magnetic recording and reproducing apparatus, a system using a control signal, a system using a pilot signal and the like have been proposed.

First, a control system using a control signal will be described.

FIG. 1 is a diagram showing a state of a magnetic tape recorded by a magnetic recording and reproducing apparatus of a helical scanning system where control tracks other than video signal tracks are provided. In FIG. 1, a video signal track 2 is obliquely recorded on a magnetic tape 1 for one field usually regarded as a unit and a control signal 3 is recorded at fixed intervals in a tape travelling direction. The control signal 3 serves to control the travel of the tape so that a video signal magnetic head 5 can precisely scan the video signal track 2 at the time of reproduction. In the following description, a signal before it is recorded on the magnetic tape 1 is referred to as a to-be-recorded control signal, a signal recorded on the magnetic tape 1 is referred to as a recorded control signal 3 and a signal reproduced from the magnetic tape 1 is referred to as a reproduced control signal J. All these control signals are generally and simply referred to as a control signal.

Generally, the control signal 3 is obtained by ½ frequency division of a vertical synchronizing signal of a video signal to be recorded. In consequence, the travelling state of the magnetic tape 1 is controlled so that in the reproducing operation the time when a control head 6 detects the control signal 3 coincides with the time when the video signal magnetic head 5 comes in the vicinity of a leading edge of the video signal track 2 (namely, in a portion where the vertical synchronizing signal is recorded).

If the magnetic tape 1 is temporarily stopped at an arbitrary time during a recording operation and then operated again at an arbitrary timing to immediately restart the recording operation, a disturbance would appear in a reproduced picture at the recorded jointing portion, since the recording phase of the video signal track 2 becomes different or the angle of inclination of the video signal track 2 is changed at such jointing portion. For example, when the magnetic tape 1 is temporarily stopped, the travelling locus of the video signal magnetic head 5 becomes as shown by the dotted lines 4 in FIG. 1. In order to prevent such disturbance of a picture in the jointing portion, an operation as described below is performed in a servo control system.

When a temporary stop instruction is provided during the recording operation, the recording operation is immediately stopped and the magnetic tape 1 is moved by a certain amount in the backward direction. Then, movement of the magnetic tape 1 is stopped and the magnetic tape 1 is in a waiting state for recording.

After that, when the temporary stop instruction is cancelled, the magnetic tape 1 starts to move in the forward direction. At this time, control is made such that until before the recording operation is started a reproduced control signal J from a control track of the magnetic tape 1 is synchronized with a vertical synchronizing signal to be used as a reference for a video signal which is to be newly recorded. More specifically, after the phase of the previously recorded video signal track is made to coincide with the phase of a video signal track to be newly recorded, the record mode is selected to restart the recording operation. Thus, continuous recording is performed so that a disturbance may not appear at the time of reproduction in a jointing portion between a previously recorded picture and a newly recorded picture.

Next, as an example of the system using a pilot signal, a 4f pilot signal control system will be described.

FIG. 2 is a diagram showing a relation between the video signal tracks formed obliquely in a longitudinal direction of a magnetic tape 7 and the pilot signals recorded in a manner overlapping with a video signal in the respective video signal tracks. Referring to FIG. 2, in the video signal tracks $F_1$, $F_2$, $F_3$ and $F_4$, the pilot signals having frequencies $f_1$, $f_2$, $f_3$ and $f_4$, respectively, are recorded in an overlapping manner. These frequencies satisfy the conditions of $$|f_2-f_1| \simeq |f_3-f_4| = f_a,$$

$$|f_1-f_4| \simeq |f_2-f_3| = f_b, \quad f_a \neq f_b.$$

Now let us assume a case in which the magnetic head 8 tracks the video signal track $F_1$ on the magnetic tape 7 as shown in FIG. 2, for example. A pilot signal component detected by the magnetic head 8 includes not only a pilot signal of the frequency $f_1$ superimposed on the video signal track $F_1$ but also pilot signals superimposed on the two adjacent tracks ($F_2$ and $F_4$ in the example of FIG. 2) by a side read effect, cross-talk or the like. The magnitude of the pilot signals detected from these adjacent tracks becomes large according to the increase of deviation from the center of the video signal track tracked by the magnetic head 8. As a result, the magnitude of $|f_2-f_1|$ and that of $|f_4-f_1|$ are voltage converted and, based on the obtained values, a direction of deviation from the center of the video signal track is detected, so that an amount of deviation from the center of the video signal track is detected according to a difference component. The error component thus detected is fed back to the servo control system, whereby the travel of the magnetic tape is controlled.

However, as in the case of a control system using a control signal, a magnetic recording and reproducing apparatus using such a pilot signal control system involves a disadvantage that it does not have a continuous recording function without causing disturbance at the time of reproduction in a jointing portion between a previously recorded picture and a newly recorded picture.

SUMMARY OF THE INVENTION

Therefore, a primary object of the present invention is to make an improvement of a magnetic recording and reproducing apparatus of such a control system as described above, thereby to provide a magnetic recording and reproducing apparatus capable of continuous recording without causing disturbance in a jointing portion of a reproduced picture.

Briefly stated, a magnetic recording and reproducing apparatus in accordance with the present invention is adapted such that a cue signal is recorded in a cue track provided besides a video signal track when a magnetic tape is temporarily stopped during the recording operation and is moved in the backward direction by a fixed amount, and when the temporary stop is cancelled and the magnetic tape is moved in the forward direction, the recording operation is restarted responsive to the cue signal. Preferably, after cancellation of the temporary stop until restart of the recording operation, control is made such that coincidence of the frequency and phase of the reproduced pilot signal and those of a pilot signal to be recorded is established.

As described in the foregoing, in a magnetic recording and reproducing apparatus of a control system in accordance with the present invention, the recording operation is restarted responsive to a cue signal recorded on a cue track and, accordingly, successive recording can be performed in an ideal manner without causing any disturbance in the jointing portion of a picture.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 3:
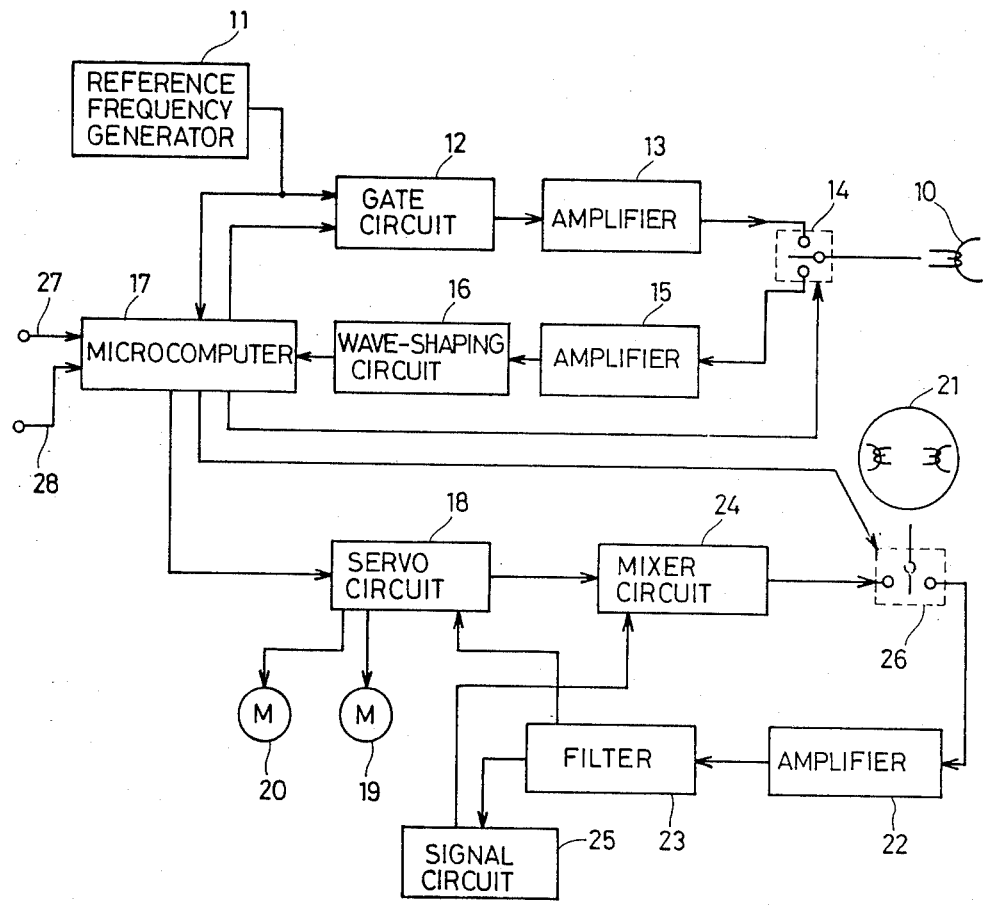
FIG. 3 is a schematic block diagram showing an embodiment of the present invention.

FIG. 3 is a schematic block diagram showing an embodiment of the present invention applied to a control system using a pilot signal. Referring to FIG. 3, a signal circuit 25 is connected to a mixer circuit 24 and the mixer circuit 24 is connected to a video signal magnetic head 21 through a recording/reproduction selecting switch 26. The signal circuit 25, the mixer circuit 24, the recording/reproduction selecting switch 26 and the video signal magnetic head 21 constitute a video signal recording circuit. A servo circuit 18 for control of a capstan motor 19 and a reel motor 20 for controlling the travel of a magnetic tape 7 is connected to the mixer circuit 24. At the time of recording, a video signal from the signal circuit 25 is supplied to the mixer circuit 24 to be overlapped by a pilot signal from a servo circuit 18 and the video signal with the pilot signal is introduced by means of the video signal magnetic head 21 provided on a rotational drum through the recording/reproduction selecting switch 26 so as to be recorded in a video signal track on the magnetic tape 7.

The video signal magnetic head 21 is connected to an amplifier 22 through the recording/reproduction selecting switch 26. The amplifier 22 is connected to a filter 23, which is connected to the signal circuit 25 and the servo circuit 18. The video signal magnetic head 21, the recording/reproduction selecting switch 26, the amplifier 22, the filter 23 and the signal circuit 25 constitute a video signal reproducing circuit. At the time of reproduction, the video signal as well as the pilot signal reproduced from the video signal track by means of the video signal magnetic head 21 is supplied to the amplifier 22 through the recording/reproduction selecting switch 26 so as to be amplified. The output of the amplifier 22 is supplied to the filter 23 so as to be divided into a video signal and a pilot signal, which are supplied to the signal circuit 25 and the servo circuit 18, respectively.

A reference frequency generator 11 is connected to a gate circuit 12 and a microcomputer 17 for system control (a one-chip microcomputer integrally comprising a ROM, a RAM and input and output ports). The gate circuit 12 is connected to an amplifier 13 and the amplifier 13 is connected to a recording and reproducing cue head 10 through a recording/reproduction selecting switch A14. The microcomputer 17 is connected to the gate circuit 12. The reference frequency generator 11, the gate circuit 12, the amplifier 13, the recording/reproduction selecting switch 14 and the cue head 10 constitute a circuit for recording pulses on a cue track 50, shown in FIG. 4. At the time of recording pulses on a cue track 50, the pulses of the reference frequency generated in the reference frequency generator 11 are supplied to the amplifier 13 through the gate circuit 12 so as to be amplified. The output of the amplifier 13 is provided to the cue head 10 through the recording/reproduction selecting switch 14 so as to be recorded on the cue track 50 on the magnetic tape 7. The microcomputer 17 controls the opening and the closing of a gate of the gate circuit 12 and the gate circuit 12 operates to limit the number of the pulses from the reference frequency generator 11 to be recorded on the cue track 50. The microcomputer 17 counts the number of pulses thus limited.

The cue head 10 is connected to an amplifier 15 through the recording/reproduction selecting switch 14. The amplifier 15 is connected to a wave-shaping circuit 16, which is connected to the microcomputer 17. The cue head 10, the recording/reproduction selecting switch 14, the amplifier 15 and the wave-shaping circuit 16 constitute a circuit for reproducing the pulses recorded on the cue track 50. At the time of reproducing the pulses from the cue track 50, the pulses reproduced from the cue track 50 by means of the cue head 10 are supplied to the amplifier 15 through the recording/reproduction selecting switch 14 so as to be amplified. The output of the amplifier 15 is wave-shaped in the wave-shaping circuit 16 to be supplied to the microcomputer 17.

The microcomputer 17 is connected to the servo circuit 18, the recording/reproduction selecting switch 14 and the recording/reproduction selecting switch 26. The microcomputer 17 provides an instruction to the servo circuit 18 for controlling the travel of the magnetic tape and provides an instruction for mode selection to the recording/reproduction selecting switch 14 and the recording/reproduction selecting switch 26.

Figure 4:
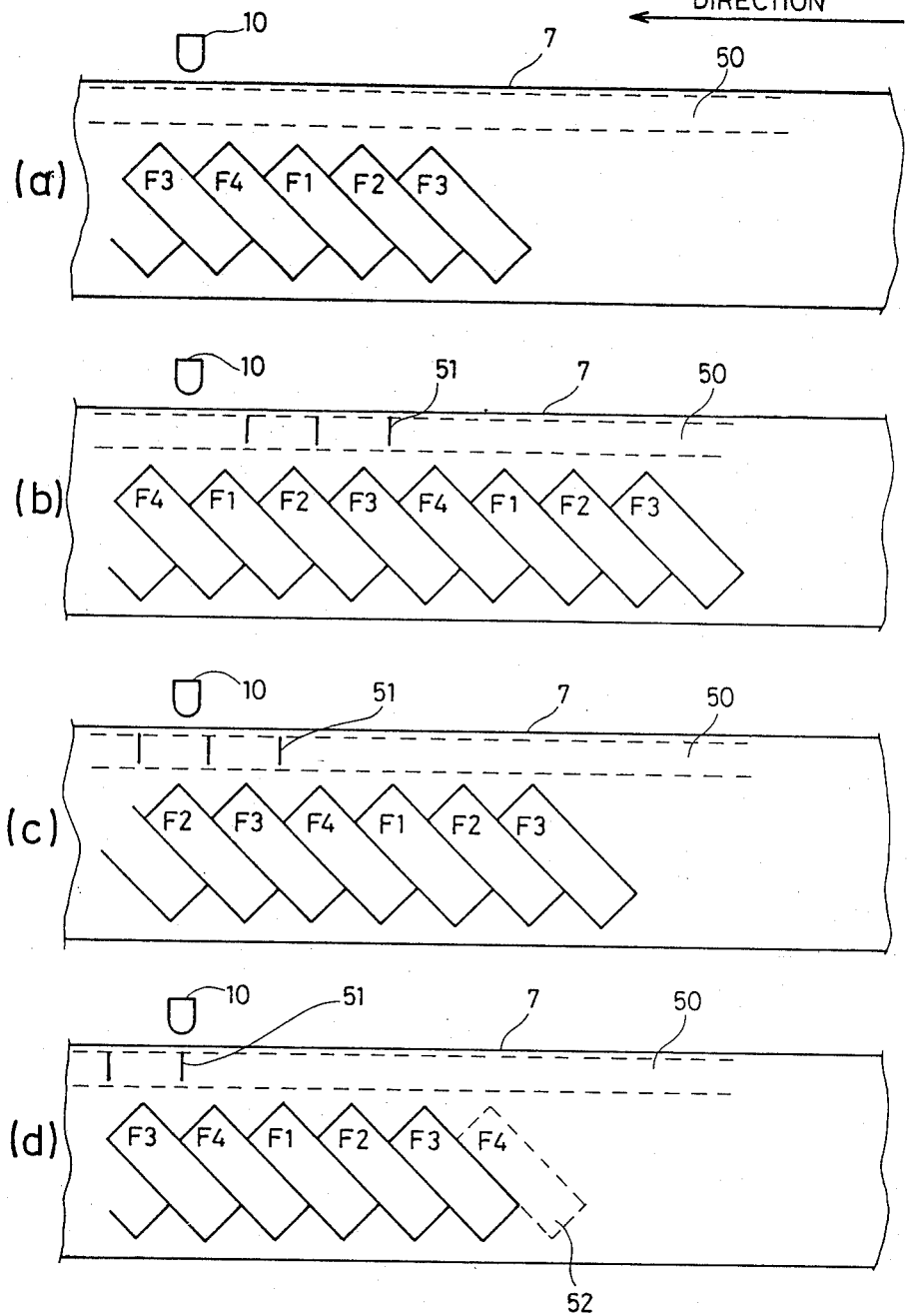
FIGS. 4 (a)–(d) show recorded states on a magnetic tape for explaining the operation of the embodiment shown in FIG. 3.
Figure 5:
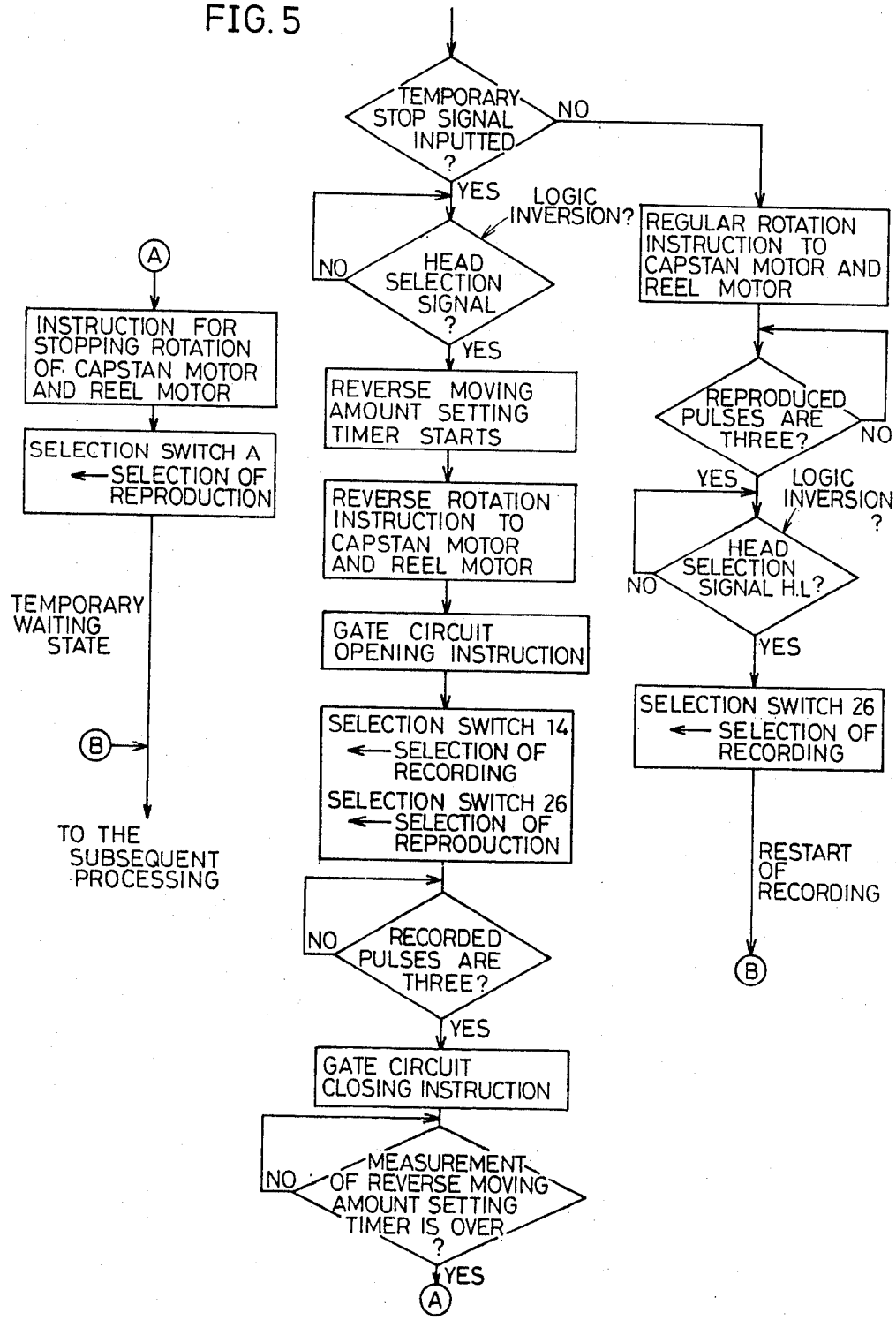
FIG. 5 is a flow chart of the operation of the embodiment shown in FIG. 3.

FIG. 4 shows recorded states on the magnetic tape for explaining the operation of the embodiment shown in FIG. 3. The operation of this embodiment will be described with reference to a flow chart in FIG. 5.

Now, assuming that a recording operation is being made, pilot signals of the frequencies $f_1$, $f_2$, $f_3$ and $f_4$ are cyclically recorded on the magnetic tape 7 by means of the video signal magnetic head 21 in a manner overlapping with a video signal, as shown in FIG. 4(a).

When a temporary stop signal 27 is supplied to the microcomputer 17 in this state (as indicated in the central top end of the flow chart), the microcomputer 17 starts an operation of a backward moving amount setting timer for determining a backward moving amount of the magnetic tape 7 in synchronism with the selection of a head selecting signal 28, namely, after completion of recording of a video signal track where recording is in progress at that time, and the microcomputer 17 provides a reverse rotation instruction to the capstan motor 19 and the reel motor 20 through the servo circuit 18, thereby to rotate reversely the capstan motor 19 and the reel motor 20, so that the magnetic tape 7 is moved in the backward direction by a fixed amount. At the same time, the microcomputer 17 provides an instruction to the gate circuit 12 to open the gate of the gate circuit 12 and the recording/reproduction selecting switch 14 is set to the recording mode, while the recording/reproduction selecting switch 26 is set to the reproduction mode. Thus, several pulses from the reference frequency generator 11 (for example, three pulses of the reference frequency 60 Hz in this case) are recorded on the cue track 50 by means of the cue head 10. At this time, since the recording/reproduction selecting switch 26 is set to the reproduction mode, a recording operation is not performed. The microcomputer 17 counts the number of recorded pulses and determines whether the number of pulses is three or not. If it is determined that the number of the recorded pulses is three, namely, in case of (YES), the microcomputer 17 then provides a gate circuit close instruction to the gate 12 and determines whether the measurement by the backward moving amount setting timer for the magnetic tape 7 is over or not. If the magnetic tape 7 is moved in the backward direction by a fixed amount and in case of YES, the microcomputer 17 provides a reverse rotation stop instruction to the capstan motor 19 and the reel motor 20 through the servo circuit 18 so that the reverse rotation of the capstan motor 19 and the reel motor 20 is stopped. Then, the gate of the gate circuit 12 is closed so that the recording/reproduction selecting switch 14 is set to the reproduction mode. At the time when the magnetic tape 7 is moved in the backward direction by a fixed amount through the above described operation, movement of the magnetic tape 7 is stopped temporarily to bring the magnetic tape 7 into a state of waiting for recording. The state of the magnetic tape 7 at this time is shown in FIG. 4(b). The reference numeral 51 indicates the pulses recorded on the cue track 50. When the temporary waiting state for recording is cancelled, the program proceeds to the central top end in the flow chart through the following processing. At this time, when a temporary stop signal is not supplied, the microcomputer 17 provides a forward rotation instruction to the capstan motor 19 and the reel motor 20, thereby to rotate the capstan motor 19 and the reel motor 20 in the forward direction, so that the magnetic tape 7 moves in the forward direction. At the same time, the pilot signals recorded in a manner overlapping with the video signal on the magnetic tape 7 are extracted through the video signal magnetic head 21, the amplifier 22 and the filter 23, and control is made such that the frequency and the phase thereof are made to coincide with the frequency and the phase of a pilot signal to be newly recorded cyclically (for example, the frequency $f_1$ of the pilot signal on the magnetic tape 7 is made to coincide with the frequency $f_1$ of a pilot signal to be newly recorded), by control of the travel of the magnetic tape 7 by means of the capstan motor 19 and the reel motor 20. Also at the same time, the recording/reproduction selecting switch 14 is set to the reproduction mode, so that the pulses 51 recorded on the cue track 50 on the magnetic tape 7 are reproduced by means of the cue head 10. The pulses thus reproduced are supplied to the microcomputer 17 through the amplifier 15 and the wave-shaping circuit 16. The microcomputer 17 counts the number of the reproduced pulses and determines whether the number becomes three or not. The state of the magnetic tape 7 at this time is shown in FIG. 4(C). Subsequently, if the microcomputer 17 counts the predetermined number of the pulses reproduced from the cue head 10, namely in case of YES, in other words, if the count becomes equal to the number of the pulses 51 recorded on the cue track 50 at the time of backward movement of the magnetic tape 7, the microcomputer 17 sets the recording/reproduction selecting switch 26 to the recording mode in synchronism with a head selecting signal 28 indicating the selection timing of the video signal magnetic head 21. The state of the magnetic tape 7 at this time is shown in FIG. 4(d). The reference numeral 52 indicates the state of a video signal track to be newly recorded. Then, the regular recording operation is restarted.

Preferably, the fixed amount of backward movement of the magnetic tape 7 is obtained by representing as a length of the magnetic tape 7 the time at least required for making the frequency and the phase of the pilot signal recorded in an overlapping manner on the magnetic tape 7 coincide with the frequency and the phase of a pilot signal to be newly recorded, when the magnetic tape 7 moves in the forward direction after cancellation of a temporary stop. As a result, control is made such that coincidence of the frequency and phase of the reproduced pilot signal and those of the pilot signal to be recorded is well established before the recording operation is restarted on the occasion of restart of the recording operation after a temporary stop thereof and hence successive recording can be performed in an ideal manner without causing any disturbance in a jointing portion of a picture.

Although in the above described embodiment the pulses to be recorded on a cue track were three pulses of the frequency of 60 Hz, only one pulse of an arbitrary frequency may be recorded at the minimum, and the frequency and the number of pulses may be selected in an arbitrary manner so as to be adaptable according to a system.

Although in the foregoing a description was made of a case where recording, temporary stop, and recording are in succession made as an example, continuous recording can be made in the same manner in case of restarting the recording operation from a stop state, except for the steps for the temporary stop state of waiting.

In addition, by suitably selecting the number of pulses recorded on a cue track and the duty ratio, the recorded pulses can be utilized for starting from a desired top portion or for other suitable purposes.

Although the present invention has been described and illustrated in detail, it is clearly understood that the same is by way of illustration and example only and is not to be taken by way of limitation, the spirit and scope of the present invention being limited only by the terms of the appended claims.

Figure 1:
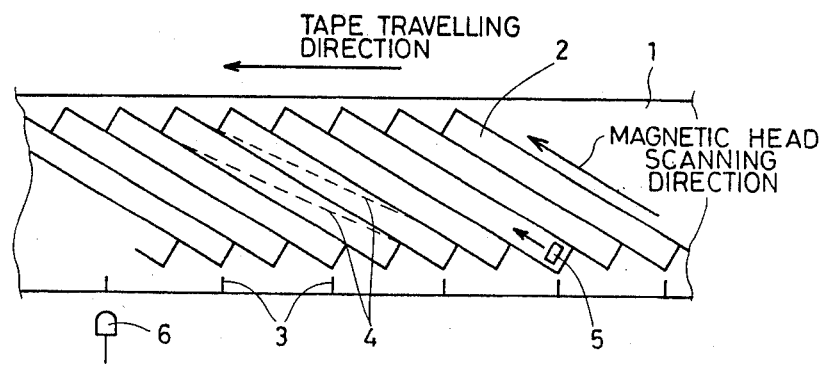
FIG. 1 is a diagram showing a state of a magnetic tape recorded by a magnetic recording and reproducing apparatus of a conventional control signal control system.

What is claimed is:

1. A magnetic recording and reproducing apparatus capable of recording and reproducing a video signal in and from a recording medium (7), said apparatus employing a rotating head system (21) in which a video head is mounted on the circumference of a rotating drum, and a helical scanning system (21, FIG. 1) in which said recording medium is adapted to travel slantingly with respect to the direction of rotation of said video head, whereby a plurality of recorded video signal tracks are formed on said recording medium arranged in the direction of travel side by side and slantingly with respect to the direction of travel, said magnetic recording and reproducing apparatus comprising:

operation mode selecting means (17) for selecting operations of said magnetic recording and reproducing apparatus, said operations including a recording operation of said video signal, a reproducing operation of said video signal, a temporary stop of said recording operation of said video signal, and a cancellation of said temporary stop, recording medium driving means (19, 20) responsive to a drive control signal for driving said recording medium for forward directional movement thereof, for reverse directional movement thereof, or for stoppage thereof, forward directional movement driving signal providing means (17, 18) responsive to selection of said recording operation or said reproducing operation of said video signal for providing, as said drive control signal, a forward directional movement driving signal to said recording medium driving means for forward directional movement of said recording medium, temporary stop signal providing means (17, 18) responsive to selection of said temporary stop of said recording operation for providing, as said drive control signal, a temporary stop signal to said recording medium driving means for bringing said recording medium in forward directional movement of said recording medium to a stop, reverse directional movement driving signal providing means (17, 18) responsive to said stop of said recording medium for providing, as said drive control signal, a reverse directional movement driving signal to said recording medium driving means for driving said recording medium for reverse directional movement thereof by a predetermined amount, recording operation disabling means (17, 26) associated with said reverse directional movement driving signal providing means for disabling said recording operation of said video signal for a period of said reverse directional movement of said recording medium, a cue head (10) provided associated with said recording medium for recording and reproducing a cue signal in and from a cue track formed on said recording medium separate from said video signal tracks, cue signal providing means (11, 12, 13) associated with said reverse directional movement driving signal providing means for providing a cue signal to said cue head during said reverse directional movement of said recording medium, forward directional movement restarting signal providing means (17) responsive to said cancellation of said temporary stop for providing, as said drive control signal, a forward directional movement restarting signal to said recording medium driving means for regaining said forward directional movement of said recording medium, cue signal recording/reproducing control means (17, 14) responsive to said temporary stop of said recording operation for performing a recording operation of said cue signal by said cue head at said cue track for a period of said reverse directional movement of said recording medium and responsive to said cancellation of said temporary stop for performing a reproducing operation of said cue signal by said cue head from said cue track for a certain period of said restarted forward directional movement of said recording medium, and video signal recording restart control means (17, 26) responsive to reproduction of said cue signal during a period of said restarted forward directional movement of said recording medium for restarting said recording operation of said video signal.

2. A magnetic recording and reproducing apparatus in accordance with claim 1, wherein said video signal restart control means (17, 26) comprises video signal recording/reproducing control means (17, 26) responsive to said cancellation of said temporary stop of said recording operation for performing a reproducing operation of said video signal by said video head during a period of said restarted forward directional movement of said recording medium and responsive to said reproduction of said cue signal for causing a change from said reproducing operation to said recording operation of said video signal.

Figure 2:
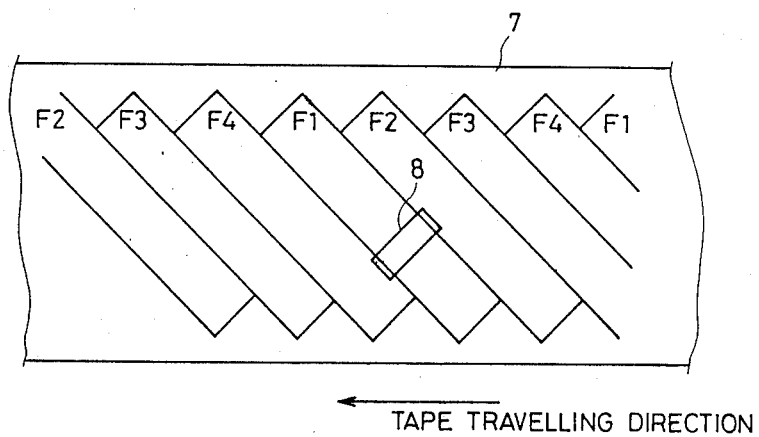
FIG. 2 is a diagram showing a state of a magnetic tape recorded by a magnetic recording and reproducing apparatus of a pilot signal control system which constitutes a background of the present invention.

3. A magnetic recording and reproducing apparatus in accordance with claim 1, which further employs a pilot signal system (FIG. 2) in which pilot signals having different frequencies are recorded in an overlapping manner with said video signal at different video signal tracks, respectively, and are reproduced for use in control of a travel of said recording medium in synchronism with said recorded video signal tracks.

4. A magnetic recording and reproducing apparatus in accordance with claim 3, which further comprises
pilot signal providing means for providing said pilot signals having different frequencies to be recorded in an overlapping manner with said video signal at said different video signal tracks, respectively, and
frequency and phase control means responsive to said reproduced pilot signals and said newly provided pilot signals to be recorded for controlling said recording operation such that coincidence of the frequency and phase of said reproduced pilot signal and the frequency and phase of said newly provided pilot signals to be recorded is established after said cancellation of said temporary stop until said restart of said recording operation of said video signal.

5. A magnetic recording and reproducing apparatus in accordance with claim 1, wherein said recording operation disabling means (17, 26) comprises
temporary reproducing operation causing means (17, 26) responsive to said temporary stop of said recording operation for causing a change from said recording operation to a reproducing operation, whereby said recording operation is disabled until said restart of said recording operation of said video signal by means of said video signal restart control means.

6. A magnetic recording and reproducing apparatus in accordance with claim 1, wherein
said cue signal comprises a cue pulse signal recorded separately from synchronization control signals.

7. A magnetic recording and reproducing apparatus in accordance with claim 6, wherein
said cue pulse signal comprises a predetermined plurality of cue pulse signals, and
said reverse directional movement driving signal providing means (17, 18) comprises
counter means responsive to said predetermined plurality of cue pulse signals for counting the same for determining said predetermined amount of said reverse directional movement.

8. A magnetic recording and reproducing apparatus in accordance with claim 7, wherein
said forward directional movement restarting signal providing means (17, 18) comprises
counter means responsive to said cue head for counting the number of said predetermined plurality of cue pulse signals reproduced by said cue head for determining the timing for regaining said forward directional movement of said recording medium.

9. A magnetic recording and reproducing apparatus in accordance with claim 1, further comprising control signal recording and reading head means for recording a control signal in a track separate from said plurality of recorded video signal tracks.

10. A magnetic recording and reproducing apparatus in accordance with claim 9, wherein
said cue signal comprises a cue pulse signal recorded separately from synchronization control signals.

* * * * *